(12) United States Patent
Chen et al.

(10) Patent No.: US 7,529,819 B2
(45) Date of Patent: May 5, 2009

(54) COMPUTER-BASED SWITCH FOR TESTING NETWORK SERVERS

(75) Inventors: Yue Chen, Bellevue, WA (US); Brian E King, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 562 days.

(21) Appl. No.: 09/758,831

(22) Filed: Jan. 11, 2001

(65) Prior Publication Data

US 2002/0091969 A1 Jul. 11, 2002

(51) Int. Cl.
- G06F 15/173 (2006.01)
- G06F 3/00 (2006.01)
- G06F 13/12 (2006.01)
- G06F 11/00 (2006.01)

(52) U.S. Cl. .......... 709/223; 709/221; 709/225; 710/5; 710/65; 714/4; 714/38; 714/43

(58) Field of Classification Search ........... 714/38; 710/5, 65; 709/232, 223, 224, 228
See application file for complete search history.

(56) References Cited

U.S. PATENT DOCUMENTS

| | | | | |
|---|---|---|---|---|
| 5,862,362 | A * | 1/1999 | Somasegar et al. | 703/21 |
| 6,105,151 | A * | 8/2000 | Mahalingam et al. | 714/48 |
| 6,314,531 | B1 * | 11/2001 | Kram | 714/38 |
| 6,442,141 | B1 * | 8/2002 | Borella et al. | 370/248 |
| 6,901,357 | B1 * | 5/2005 | Patiejunas | 703/14 |

OTHER PUBLICATIONS

Derfler, Frank J., How Networks Work, 2000, Que Corporation, Millenium Edition, 143-167, 196-201.*

Bonomi, F., et al., "A Case Study of an Adaptive Load Balancing Algorithm", *J.C. Baltzer A.G. Scientific Publishing Company*, Oct. 1990, vol. 7, No. 1, pp. 23-49.

Derfler, Frank J.,Jr., et al., "Crash-Proof", *PC Magazine*, Apr. 4, 2000, pp. 134-150.

Harbaugh, Logan G., "How we Tested" *InternetWeek*, Jan. 24, 2000, pp. 32.

Kashem, M.A. et al., "Network reconfiguration for load balancing in distribution networks", IEE Proceedings - Generation, Transmission and Distribution, Nov. 1999, vol. 146, No. 6, pp. 563-567.

Kashem, M.A. et al., "A novel approach for network reconfiguration based load balancing in distribution networks", Electric Machines and Power Systems, May 2000, vol. 28, No. 5, pp. 415-431.

* cited by examiner

*Primary Examiner*—Alan Chen

(57) ABSTRACT

A computer-based switch enables automated testing of the fail-over and load-balancing operations of a cluster of network servers. The computer-based switch includes a control component, a switching component, and a plurality of network adapters each for forming a connection with a network server. The switching component directs network communication data received from clients on an external network to the network servers through the network adapters. The network adapters are selectively disabled and re-enabled by the control component to create connection failure and recovery conditions. The switching component is also programmable to operate on the network communication data passing therethrough to create other test conditions such as communication delay, data loss, data reordering, and data corruption. The switching component also allows communication flows from the individual network servers to the clients to be monitored for determining whether load balancing of the servers is properly performed.

30 Claims, 2 Drawing Sheets

COMPUTER-BASED SWITCH FOR TESTING NETWORK SERVERS

TECHNICAL FIELD OF THE INVENTION

This invention relates generally to computer networks, and more particularly to the testing of network servers for operations such as fail-over and load balancing.

BACKGROUND OF THE INVENTION

In many network communication applications, multiple network servers are operated in parallel to increase the amount of network communication traffic the system can handle. For instance, it is common for a site on the World-Wide Web on the Internet to employ a cluster of network servers to ensure that its web pages can be browsed by a large number of computers on the Internet at the same time.

In a system employing a cluster of network servers, an incoming communication packet received from the network is typically passed through a hardware switch, which directs the packet to all of the servers in the cluster. The servers are connected by a private network, over which the servers communicate and assign responsibility for each new request that comes in over the hardware switch. The communications among the servers allow them to cooperate to handle fail-over and load balancing operations. In one scenario, "fail-over" means that when the physical connection between the switch and a server fails, the connection failure is detected by the server, and its work is taken up by the other servers with good connections. "Load-balancing," on the other hand, means that when a server is already busy, further communication packets that originally would be handled by that server will be handled by the other servers that are available.

In order to ensure that the fail-over and load-balancing mechanisms are properly implemented in the network servers, the provider of the server software has to put the servers under test conditions and monitor the behavior of the servers. For instance, to test the fail-over mechanism, the server software provider has to create connection failure conditions and observe whether the servers can detect a failed connection and cause communication packets to be handled by other servers with good connections. Such tests, however, have been difficult to perform using existing network switches. Conventional network switches, which are hardware-based, do not lend themselves to flexible, automated, server testing. In order to generate connection failure conditions for testing the fail-over operation, the tester has to physically disconnect and reconnect the cables connecting the network switch and the servers being tested. Such manual operation is not only tedious and time consuming but also prone to errors. Moreover, it is also difficult to monitor communications passing through a conventional hardware-based network switch for the purpose of determining whether the servers have achieved effective load balancing.

SUMMARY OF THE INVENTION

In view of the foregoing, the present invention provides a computer-based network switch that is especially useful for testing network servers. The computer-based switch not only enables automated testing of the fail-over function of the network servers by providing program-controlled creation of connection failure conditions, but also allows network communication streams from the servers through the switch to an external network to be conveniently monitored for testing the load-balancing function. The computer-based switch includes a test control component, a switching component, a first network adaptor for connecting to an external network, and a plurality of second network adapters each for forming a connection with a network server and functions as a port to that server. The switching component directs network communication data it receives from the external network through the first network adapter to the second network adapters for transmission to the network servers. The second network adapters may be selectively disabled and enabled by the control component to create failure and recovery conditions of the connections between the second network adapters and the respective network servers. Network communication problems other than the failure of the physical connections, such as delay, data loss, data corruption, and data reordering, etc., can also be simulated by the switching component on the communication data passing through it. Moreover, the network traffic from the servers to the external network indicates the respective workloads of the servers. Thus, the switching component can be used to monitor communication data flows from the network servers to the external network to determine whether load-balancing mechanism is functioning properly.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
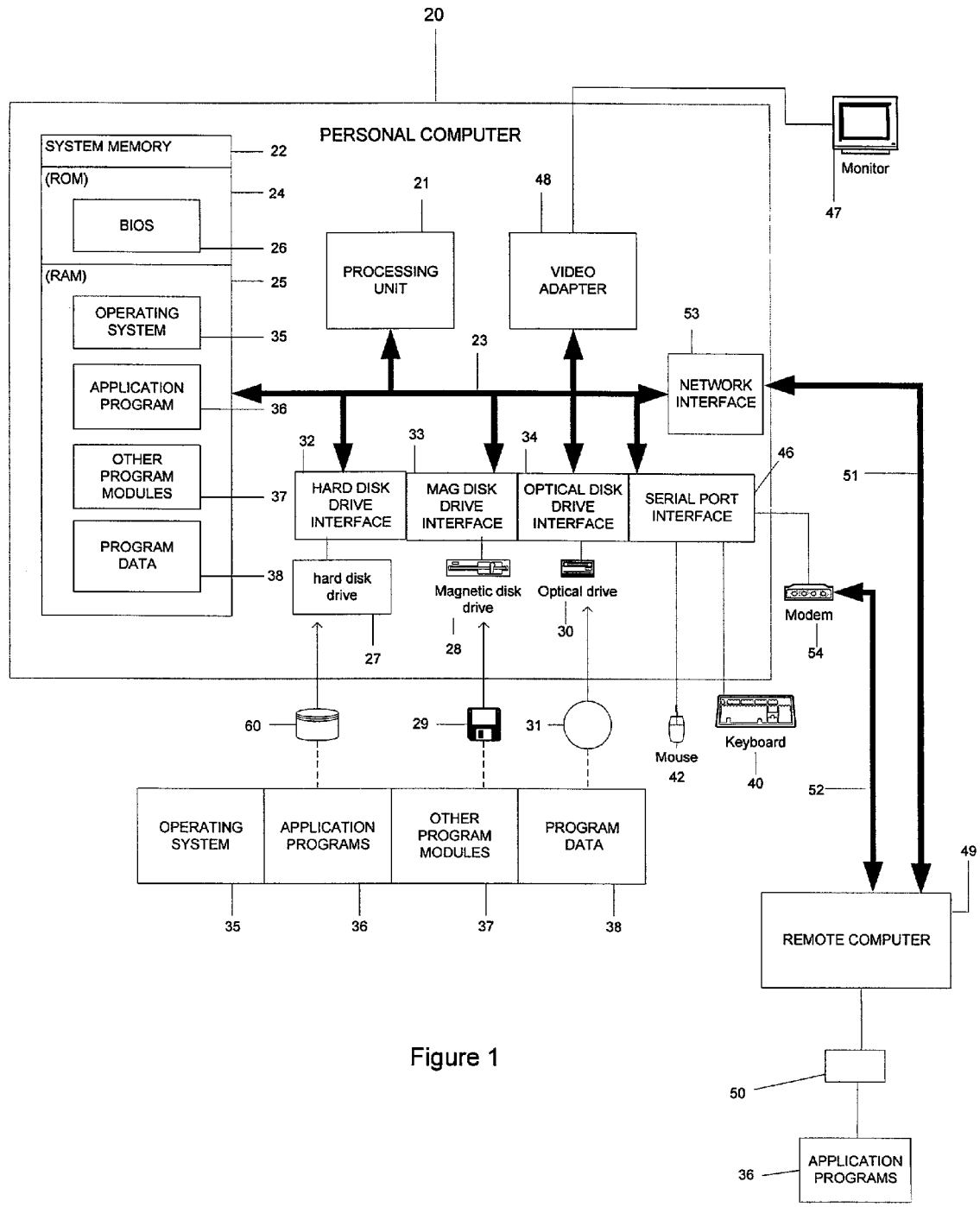
FIG. 1 is a block diagram generally illustrating an exemplary computer system on which the present invention may reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like.

The invention may also be practiced in distributed computing environments where tasks are performed by remote processing devices that are linked through a communications network. In a distributed computing environment, program modules may be located in both local and remote memory storage devices.

The following description begins with a description, with reference to FIG. 1, of a general-purpose computing device that may form the building block for the computer systems and networks in which the present invention may be implemented. The present invention is described in detail with reference to FIG. 2. Turning now to FIG. 1, an exemplary general-purpose computing device in the form of a conventional personal computer 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
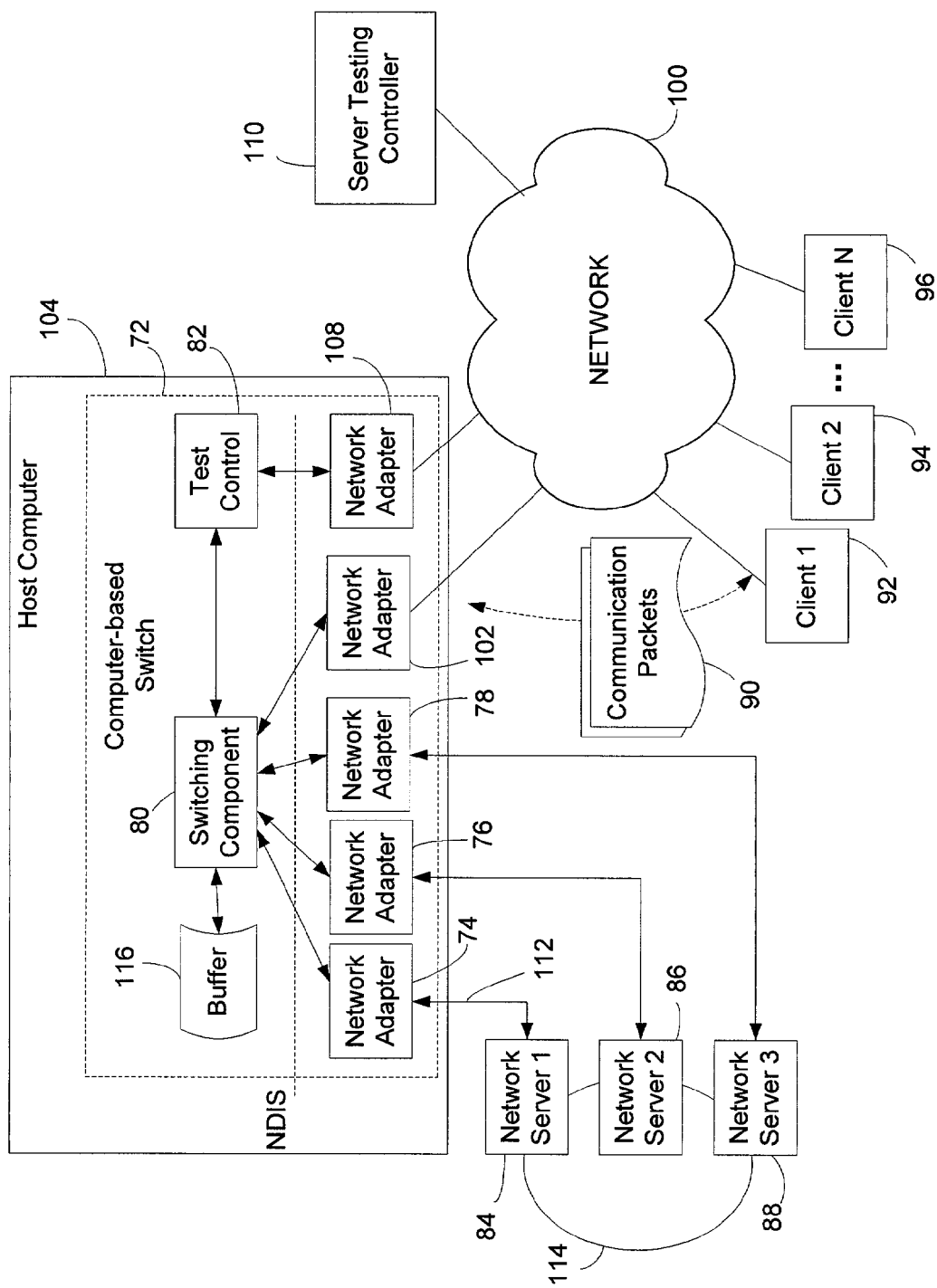
FIG. 2 is a schematic diagram showing an embodiment of a system for testing network servers that employs a computer-based network switch in accordance with the invention.

Referring now to FIG. 2, the present invention is directed to a computer-based network switch 72 that enables automated creation of connection failure conditions and simulation of other communication problems and allows communication data flows passing therethrough to be conveniently monitored. As will be described in greater detail below, the computer-based network switch 72 is especially useful for testing the fail-over and load-balancing operations of network servers that communicate with an external network 100 through the computer-based network switch. It will be appreciated, however, that such a computer-based network switch may be employed in computer network systems for other purposes and functionality.

Specifically, the computer-based network switch 72 in accordance with the invention includes a switching component 80, a test control component 82, a network adaptor 102 for connecting the switch to the external network 100, and a plurality of network adapters 74-78 each of which may be connected to a network server and may be viewed as a port for network communication with that network server. The term "network adapter" as used herein means a device having its hardware and software driver components that is used to interface a computer with a network for transmitting and receiving network communication data on the network. Network adapters are typically in the form of computer plug-in boards that are commonly referred to as network interface cards (NICs), with their associated drivers. In the embodiment shown in FIG. 2, for convenience of illustration, only three network adapters 74, 76, 78 for connecting to network servers 84-88 are shown, and it will be appreciated that more or fewer network adapters may be employed in the computer-based switch 72.

The switching component 80 directs incoming communication data received from the network 100 through the network adapter 102 to the servers 84-88 through the network adapters connected to the respective servers. In the illustrated embodiment, the communication data are in the form of communication packets 90 formatted according to a pre-selected network communication protocol. As will be described in greater detail below, the switching components may also be used to simulate communication problems other than a physical connection failure, such as, for example, transmission delay and packet loss, data corruption, and data reordering. Moreover, the use of the software-based switching component 80 allows communication data flows from the individual servers to the external network 100 to be monitored, thereby facilitating the testing of the load-balancing function of the servers.

In the embodiment illustrated in FIG. 2, the computer-based switch 72 is used in the context of testing the fail-over and load-balancing functions of the servers 84-88. The testing setup includes client computers 92-96 on the external network 100, which may be, for example, the Internet, a corporate intranet, or any suitable computer network. The incoming communication data received by the network adapter 102 are sent to the switching component 80, which then sends the communication data to the network adapters 74-78 and on to the servers 84-88. In the reverse direction, network traffic from the servers 84-88 to the external network 100 goes through their respective network adapters 74-78 to the switching component 80, which sends the traffic through the network adapter 102 to the external network 100.

As shown in FIG. 2, the network servers 84-88 are also interconnected by a private network 114. Communications among the servers over the private network 114 allow the servers to coordinate among themselves for handing the incoming network communication requests, including performing fail-over and load-balancing operations.

As will be described in greater detail below, by using the computer-based switch 72, the fail-over and load balancing operations of the network servers can be effectively tested. The operation of the switch 72 in such testing is controlled by the test control 82. The overall control of the server testing is provided by a server-testing controller 110, which may reside on the same host computer 104 with the computer-based switch 72, or on a separate computer and preferably is also on the network 100 as illustrated. In the latter case, another network adaptor 108 is provided to allow the test control 82 to communicate with the server-testing controller 110 to receive commands regarding the server testing and to report testing statistics. The server-testing controller 110 coordinates the server testing by instructing the client computers 92-96 on the network 100 to send communication packets 90 to the servers via the computer-based switch 72, and instructing the test control 82 to create test conditions and monitoring the responses of the drivers.

In accordance with a feature of the invention, the computer-based switch 72 can be used to create the failure of a physical connection to a selected server, such as the connection 112 to the server 84. The connection failure condition is created by disabling the network adapter 74 that is connected to that selected server. After the network adapter 74 is disabled, the incoming communication packets that normally would be handled by the server 84 can no longer pass through the network adaptor 74. The response of the servers 84-88 to this connection failure may then be observed to determine whether the fail-over mechanism works as designed.

Besides creating physical connection failure conditions as described above, the computer-based switch 72 may also be used to create other test conditions for testing the servers' responses to various communication problems. For instance, the switching component 80 may be instructed by the test control 82 to simulate communication delay by holding received communication packets from a given client in a buffer 116 for a pre-selected delay period before sending them to the target server. The switching component 80 may also be used to simulate packet loss by dropping communication packets destined to a selected server by a given percentage. Moreover, the switching component may be used to selectively introduce errors into the received communication packets, thereby creating data corruption situations. As a further example, the switching component 80 may be used to alter the order of data in a communication stream by using the buffer 116 to temporarily hold some data in the stream before forwarding them to the servers, thereby rearranging the order of data received by the servers. It will be appreciated the capability of simulating various communication problems other than physical connection failures provides significantly improved flexibility in testing network servers that is not available with conventional hardware-based network switches.

As mentioned above, another significant advantage of using the computer-based network switch 72 is that it allows the load-balancing function to be tested, which is difficult to do with conventional hardware-based switches. The testing of the load-balancing operation involves monitoring the amount of network traffic flowing from each server to the external network. The monitored network traffic from a server is a good indicator of the workload of that server. With the computer-based network switch 72, the network traffic from the servers 84-88 can be conveniently monitored. This is because the outgoing network traffic from the servers all goes through the switching component 80, which forwards the traffic through the network adapter 102 to the external network. The effectiveness of the load balancing operation of the servers can be determined by comparing the amounts of network traffic from the respective servers to see whether they are generally evenly distributed.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer functioning as a computer-based network switch, comprising:

a first network adapter for connecting to an external network;

a plurality of second network adapters each for forming a connection with a network server in a private network;

a switching component for receiving network communication data from the external network through the first network adapter and directing the received network communication data to the second network adapters for transmission to the respective network servers in the private network connected thereto; and a test control component for selectively disabling the second network adapters to create failure of physical connections between the second network adapters and the respective network servers in the private network connected thereto, the test control component further including a third network adapter for connecting the test control component to a server testing controller on the external network to allow the test control component to communicate with the server testing controller.

2. A computer as in claim 1, wherein the switching component is programmed to operate on network communication data passing therethrough to create a communication test condition other than a connection failure condition.

3. A computer as in claim 2, wherein the switching component is programmed to provide a preselected delay to network communication data passing therethrough.

4. A computer as in claim 2, wherein the switching component is programmed to selectively drop network communication data.

5. A computer as in claim 2, wherein the switching component is programmed to reorder data in a communication stream passing therethrough.

6. A computer as in claim 2, wherein the switching component is programmed to introduce errors into network communication data passing therethrough.

7. A computer as in claim 1, wherein the switching component is programmed for monitoring flows of network communication data therethrough from the respective network servers in the private network to the external network.

8. A computer-readable medium having computer-executable components for controlling a plurality of network adapters in a computer to create test conditions for testing network servers in a private network, the network servers connected to the network adapters, comprising:
a switching component for receiving network communication data from an external network and directing the received network communication data to the network adapters for transmission to the respective network servers in the private network connected thereto;
a test control for selectively disabling the network servers to create failure of physical connections between the network adapters and the respective network servers in the private network connected thereto, and configured for sending/receiving instructions with a server testing controller over a network adapter separate from the network adapters associated with the switching component.

9. A computer-readable medium as in claim 8, wherein the switching component includes further computer-executable instructions for operating on network communication data passing therethrough to create a test condition other than a connection failure condition.

10. A computer-readable medium as in claim 9, wherein the switching component includes computer-executable instructions for selectively buffering network communication data passing therethrough for a preselected delay period.

11. A computer-readable medium as in claim 9, wherein the switching component includes computer-executable instructions for selectively dropping network communication data passing therethrough.

12. A computer-readable medium as in claim 9, wherein the switching component includes computer-executable instructions for reordering data in a communication stream passing therethrough.

13. A computer-readable medium as in claim 9, wherein the switching component includes computer-executable instructions for introducing errors into network communication data passing therethrough.

14. A computer-readable medium as in claim 8, wherein the test control includes computer-executable instructions for communicating with a server testing controller to receive commands regarding testing of the network servers.

15. A computer-readable medium as in claim 8, wherein the switching component includes further computer-executable instructions for monitoring flows of network communication data from the respective network servers to the external network.

16. A system for testing network servers in a private network, comprising:
a computer functioning as a computer-based network switch, including a plurality of network adapters for forming connections to the network servers, a switching component for receiving network communication data from an external network and directing the received network communication data to the network adapters for transmission to the respective network servers in the private network connected thereto, and a test control for selectively disabling the network adapters;
a plurality of client computers connected to the external network for communication with the network servers in the private network through the computer-based network switch;
a server testing controller connected through the external network for coordinating testing of the network servers, including instructing the client computers to send network communication data to the network servers in the private network through the computer-based network switch, and causing the test control to selectively disable the network adapters to create failure of physical connections between the network adapters and the network servers in the private network connected thereto.

17. A system as in claim 16, wherein the switching component is controllable to operate on network communication data passing therethrough to create a test condition other than a connection failure condition.

18. A system as in claim 17, wherein the switching component is controllable to selectively buffer network communication data passing therethrough to introduce a preselected delay.

19. A system as in claim 17, wherein the switching component is controllable to selectively drop network communication data passing therethrough.

20. A system as in claim 17, wherein the switching component is controllable to reorder network communication data passing therethrough.

21. A system as in claim 17, wherein the switching component is controllable to introduce errors in network communication data passing therethrough.

22. A system as in claim 16, wherein the switching component is programmed for monitoring flows of network communication data from the network servers to the network clients.

23. A method of testing a plurality of network servers in a private network, comprising the steps of:
connecting the network servers to a plurality of network adapters;
receiving network communication data from an external network;
directing the received network communication data to the network adapters for transmission to the respective network servers in the private network connected thereto;
selectively disabling the network adapters using a test control component to create failure of physical connections between the network adapters and the network servers in the private network connected thereto; and
communicating, using the test control component, to a server testing controller on the external network through a third network adapter separate from others of the plurality of network adapters.

24. A method as in claim 23, further including the step of operating on the network communication data received from the external network to create a test condition other than a connection failure condition before sending the network communication data to the network servers through the network adapters.

25. A method as in claim 24, wherein the step of operating includes selectively buffering network communication data passing therethrough for a preselected delay period.

26. A method as in claim 24, wherein the step of operating includes selectively dropping network communication data passing therethrough.

27. A method as in claim 24, wherein the step of operating includes reordering network communication data passing therethrough.

28. A method as in claim 24, wherein the step of operating includes introducing errors to network communication data passing therethrough.

29. A method as in claim 23, further including the step of monitoring flows of network communication data from the network servers to the external network.

30. A computer comprising:
   a first set of network adaptors configured to connect the computer to a plurality of clients through a first network;
   a second set of network adaptors configured to connect the computer to a plurality of servers through a second network;
   a switching module configured to identify incoming communication data from the clients received by the first set of network adaptors and to send the communication data to the servers through the second set of network adaptors; and
   a testing module including a third network adapter for connecting the testing module to the external network to allow the testing module to communicate with a server testing controller on the external network, the testing module configured to create a failure of a physical connection to at least one of the servers by disabling the network adaptor corresponding to the at least one server in the second set of network adaptors;
   wherein a fail-over mechanism associated with the plurality of servers is tested by the failure of the physical connection created by the testing module.

* * * * *